(12) United States Patent
Zhu et al.

(10) Patent No.: US 11,761,093 B2
(45) Date of Patent: Sep. 19, 2023

(54) METHOD FOR PREPARING SODIUM INTERFACE AND METHOD FOR PREPARING SODIUM-BASED OPTICAL STRUCTURE DEVICE

(71) Applicant: NANJING UNIVERSITY, Suzhou (CN)

(72) Inventors: Jia Zhu, Suzhou (CN); Jianyu Yu, Suzhou (CN); Yang Wang, Suzhou (CN)

(73) Assignee: NANJING UNIVERSITY, Jiangsu (CN)

(*) Notice: Subject to any disclaimer, the term of this patent is extended or adjusted under 35 U.S.C. 154(b) by 105 days.

(21) Appl. No.: 17/607,403

(22) PCT Filed: Jan. 3, 2020

(86) PCT No.: PCT/CN2020/070258
§ 371 (c)(1),
(2) Date: Oct. 29, 2021

(87) PCT Pub. No.: WO2021/134782
PCT Pub. Date: Jul. 8, 2021

(65) Prior Publication Data
US 2022/0205108 A1      Jun. 30, 2022

(51) Int. Cl.
*C23C 26/02* (2006.01)
*B05D 1/00* (2006.01)
(Continued)

(52) U.S. Cl.
CPC ............ *C23C 26/02* (2013.01); *B05D 1/005* (2013.01); *G02B 1/10* (2013.01); *G02B 5/0808* (2013.01)

(58) Field of Classification Search
None
See application file for complete search history.

(56) References Cited

U.S. PATENT DOCUMENTS

| 3,558,347 A | 1/1971 | Gray et al. |
| 2004/0005406 A1* | 1/2004 | Niihara ................ C23C 24/087 |
| | | 427/190 |

(Continued)

FOREIGN PATENT DOCUMENTS

| CN | 105932104 | 9/2016 |
| JP | 2000214484 | 8/2000 |

OTHER PUBLICATIONS

"International Search Report (Form PCT/ISA/210) of PCT/CN2020/070258," dated Sep. 28, 2020, with English translation thereof, pp. 1-7.

(Continued)

*Primary Examiner* — Shamim Ahmed
*Assistant Examiner* — Bradford M Gates
(74) *Attorney, Agent, or Firm* — JCIP GLOBAL INC.

(57) ABSTRACT

The present invention discloses a method for preparing a sodium interface and a method for preparing a sodium-based optical structure device. This sodium interface is prepared in an inert gas atmosphere by the following steps: (1) melting solid sodium metal into liquid by heat, and stripping off solid oxides and impurities on the surface of the molten sodium metal to obtain pure liquid sodium with metallic luster; and (2) spin-coating a dielectric substrate with the liquid sodium to obtain the sodium interface tightly attached to the dielectric substrate. The prepared sodium interface can be used as a plasmon polariton material for use in plasmon polariton optical waveguides, nano-lasers and the like.

10 Claims, 4 Drawing Sheets

(51) Int. Cl.
G02B 1/10 (2015.01)
G02B 5/08 (2006.01)

(56) References Cited

U.S. PATENT DOCUMENTS

2014/0230688 A1* 8/2014 Ito .................. C23C 14/16
          427/124
2017/0174575 A1* 6/2017 Li .................. C04B 35/62805
2018/0271789 A1* 9/2018 Sung ................ A61P 17/02

OTHER PUBLICATIONS

"Written Opinion of the International Searching Authority (Form PCT/ISA/237) of PCT/CN2020/070258," dated Sep. 28, 2020, pp. 1-4.

* cited by examiner

METHOD FOR PREPARING SODIUM INTERFACE AND METHOD FOR PREPARING SODIUM-BASED OPTICAL STRUCTURE DEVICE

CROSS-REFERENCE TO RELATED APPLICATION

This application is a 371 of international application of PCT application serial no. PCT/CN2020/070258, filed on Jan. 3, 2020. The entirety of the above mentioned patent application is hereby incorporated by reference herein and made a part of this specification.

TECHNICAL FIELD

The present invention relates to the preparation of an alkali metal sodium interface, in particular to a method for preparing a sodium interface and a method for preparing a sodium-based optical structure device based on this method, and belongs to the technical field of metal surface plasmon polariton materials.

DESCRIPTION OF RELATED ART

Metal surface plasmon polariton materials have been widely concerned due to their wide application in integrated photovoltaics, photodetection, nano-lasers and other fields. Among plasmon polariton materials, noble metals such as gold and silver are the two most commonly used materials because of their relatively low losses in the visible and near-infrared bands. However, these two metals suffer great optical losses in plasmon polariton application, limiting the performance of devices. Besides, as noble metals, they are costly. Therefore, a material featuring a lower loss and lower cost is required. Alkali metal sodium was considered to be an ideal plasmon polariton material in the past due to its low interband loss. However, as it has a relatively high chemical activity, a stable and smooth metal interface and a metal micro-nano structure are difficult to prepare, and thus the application of metals in plasmon polaritons and the like are difficult to realize.

The conventional methods for preparing metal films include physical deposition and crystal growth, wherein the former has the disadvantages of high instrument cost, strict preparation conditions and long deposition time, while the latter demands a strictly controlled external environment and long growth period, and samples prepared using the two methods have limited sizes. Therefore, the large-scale production of metal films is difficult to realize. Moreover, due to the high chemical activity of sodium, a stable metal interface and a micro-nano structure can be formed only in an environment with extremely low oxygen concentration and water concentration, which is difficult to create using the above preparation methods.

SUMMARY

Objective: Aiming at the difficulty in preparing an alkali metal sodium interface and a micro-nano structure using the existing metal film preparation methods, the present invention provides a method for preparing a sodium interface and a method for preparing a sodium-based optical structure device based on this method.

Technical scheme: The method for preparing the sodium interface described herein is carried out in an inert gas atmosphere with the oxygen concentration less than 20 ppm and the water concentration less than 20 ppm, and comprises the following steps:
(1) melting solid sodium metal into liquid by heat, and stripping off solid oxides and impurities on the surface of the molten sodium metal to obtain pure liquid sodium with metallic luster; and
(2) spin-coating a dielectric substrate with the liquid sodium to obtain the sodium interface tightly attached to the dielectric substrate.

Preferably, the sodium interface is prepared in a glove box filled with an inert gas, with the ambient oxygen concentration less than 20 ppm and the water concentration less than 20 ppm.

In the step (1), the solid sodium metal is preferably heated to 150-180° C., that is, the molten liquid sodium has a temperature of 150-180° C., and at this time, the sodium interface obtained by spin coating is of good quality and has a complete appearance and a uniform thickness. The temperature of the liquid sodium affects the viscosity thereof, and thus affects the spin coating effect and the coagulation speed. Specifically, when the temperature of the liquid sodium is too high, the liquid sodium is very easy to separate from the substrate during the spin coating process and thus cannot form a sodium interface on the substrate, while when the temperature of the liquid sodium is too low, the viscosity is high, and the coagulation speed is low, so that a complete and uniform sodium interface cannot be obtained on the substrate.

The process parameters of spin coating can be adjusted according to the size of a dielectric substrate. For example, a dielectric substrate with a size of 1.5 cm×1.5 cm×0.2 mm is preferably spin-coated at 4000-8000 r/min, most preferably 6000 r/min to form a sodium interface of good quality; for a larger dielectric substrate, the spinning can be properly accelerated to prevent the liquid sodium from being coagulated too fast.

The dielectric substrate is a transparent substrate capable of isolating the sodium interface from air and not reacting with sodium. The surface, which is in contact with the liquid sodium, of the dielectric substrate can be a flat surface, and therefore the prepared sodium interface is a smooth sodium interface; the surface, which is in contact with the liquid sodium, of the dielectric substrate can also be a surface provided with a micro-nano structure, and therefore the prepared sodium interface is a sodium interface with a micro-nano structure.

Based on the method for preparing a sodium interface described above, a sodium-based optical structure device can be further prepared. Specifically, the method for preparing a sodium-based optical structure device described herein is carried out in an inert gas atmosphere with the oxygen concentration less than 20 ppm and the water concentration less than 20 ppm, and comprises the following steps:
(1) melting solid sodium metal into liquid by heat, and stripping off solid oxides and impurities on the surface of the molten sodium metal to obtain pure liquid sodium with metallic luster;
(2) spin-coating a first dielectric substrate with the liquid sodium to obtain a sodium interface tightly attached to the dielectric substrate; and
(3) covering the surface, which is not in contact with the first dielectric substrate, of the sodium interface with a second dielectric substrate, and then sealing the peripheries, which are in contact with the first dielectric substrate and the second dielectric substrate, of the sodium interface, so as to completely isolate the sodium interface from air, thereby obtaining the sodium-based optical structure device.

The preparation is preferably carried out in a glove box filled with an inert gas, with the ambient oxygen concentration less than 20 ppm and the water concentration less than 20 ppm. The process control in the steps (1) to (2) is the same as that in the method for preparing the sodium interface.

The first dielectric substrate is a transparent substrate capable of isolating the sodium interface from air and not reacting with sodium; according to the preparation demands, the surface, which is in contact with the liquid sodium, of the first dielectric substrate is a flat surface or a surface provided with a micro-nano structure, and therefore the corresponding optical structure device with a smooth sodium interface or a fine sodium-based micro-nano structure device can be prepared. As the second dielectric substrate is mainly used for sealing, substrates capable of isolating the sodium interface from air and not reacting with sodium are selected.

In the step (3), the peripheries, which are in contact with the first dielectric substrate and the second dielectric substrate, of the sodium interface can be sealed with epoxy resin to isolate the sodium interface from air.

Beneficial effects: Compared with the prior art, the present invention has the following advantages: (1) a stable sodium interface is conveniently and quickly prepared by thermally-assisted spin coating at low cost; moreover, the sample size can be adjusted, and large-scale production and preparation can be realized; the prepared sodium interface can be used as a plasmon polariton material for use in plasmon polariton optical waveguides, nano-lasers and the like; (2) the liquid sodium is tightly attached to the surface of the dielectric substrate, so that the sodium interface can be formed on the surface, which is in contact with the dielectric, of the sodium film, and the dielectric substrate can play a role in isolating the sodium interface from air; the prepared sodium device can be stably exposed to the air for long-term operation for more than three months only by sealing the back surface with another dielectric substrate after spin coating; and (3) a sodium-based micro-nano structure can be prepared using this method, and a fine sodium-based micro-nano optical structure can be realized only by processing a micro-nano structure on the dielectric substrate, so that an optical device is prepared, solving the difficulty in directly processing micro-nano structures on a sodium surface, and therefore meeting the testing and application requirements of many optical devices.

DESCRIPTION OF THE EMBODIMENTS

The technical scheme of the present invention is further described below with reference to the drawings.

Figure 1:
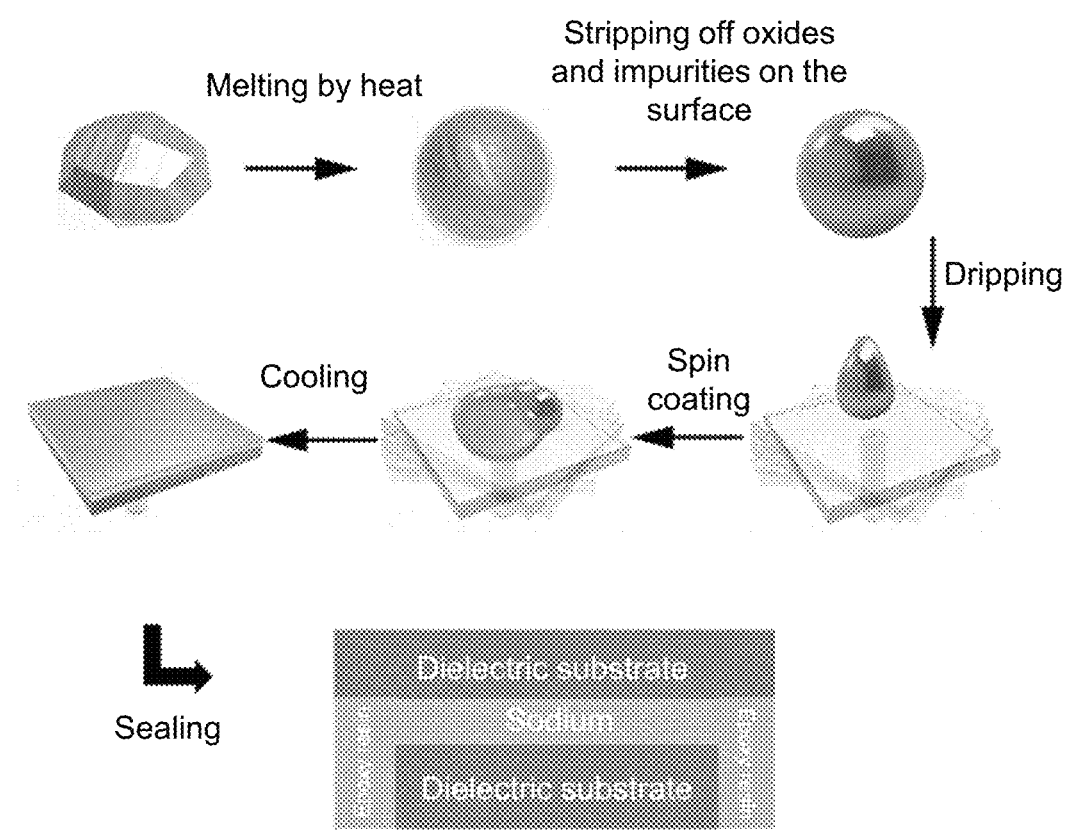
FIG. 1 is a flowchart of a method for preparing a sodium interface according to the present invention.

As shown in FIG. 1, a method for preparing a sodium interface disclosed herein comprises the following steps:
(1) melting solid sodium metal into liquid by heat, wherein during this melting process, the molten sodium is coated with a layer of fluffy solid oxides of sodium, and a small amount of impurities contained in the solid sodium diffuse to the surface, and stripping off the solid oxides and the impurities on the surface of the molten sodium to obtain a pure liquid sodium pellet with metallic luster; and
(2) spin-coating a dielectric substrate with the liquid sodium to obtain the sodium interface tightly attached to the dielectric substrate.

A dielectric substrate with a smooth and flat surface or one with a micro-nano structure can be selected according to preparation demands. Specifically, in the preparation of a smooth sodium interface, a dielectric substrate with a smooth and flat surface, such as quartz and alumina, is selected, with a flat enough surface, the roughness of about 0.1 nm, and the size capable of being adjusted according to demands; in the pre-preparation of a sodium interface with a micro-nano structure, a dielectric substrate with a micro-nano structure is adopted, wherein the micro-nano structure can be formed on the dielectric substrate in advance through processes such as ion beams and photoetching.

Specifically, a smooth dielectric substrate or one with a micro-nano structure can be quickly spun on a spin coater, and pure sodium metal droplets are dropped on the spinning dielectric substrate. Once the sodium droplets are in contact with the surface of the rotating dielectric substrate, the sodium droplets coat the substrate under the action of strong centrifugal force applied by the spinning dielectric substrate and coagulate quickly. The liquid sodium is tightly attached to the dielectric substrate to form a smooth sodium interface or a sodium interface with a micro-nano structure.

The steps (1) to (2) are carried out in an inert gas atmosphere with the oxygen concentration less than 20 ppm and the water concentration less than 20 ppm, for example, in a glove box.

The present invention simply realizes the large-scale preparation of a stable and smooth sodium interface and a sodium-based micro-nano structure at low cost by thermally-assisted spin coating. A method for preparing a sodium-based optical structure device based on the method for preparing a sodium interface comprises the following steps: after the sodium interface is prepared according to the steps (1) to (2), in the same preparation environment, covering the surface, which is not in contact with the dielectric substrate, of the sample prepared in the step (2) with another dielectric substrate and then sealing the peripheries, which are in contact with these two dielectric substrates, of the sodium interface, so as to locate the sodium interface between the two dielectric substrate layers and thus to completely isolate the sodium interface from air, thereby obtaining a sodium-based optical structure device.

Example 1

A smooth sodium interface was prepared by the following specific steps.

Figure 2:
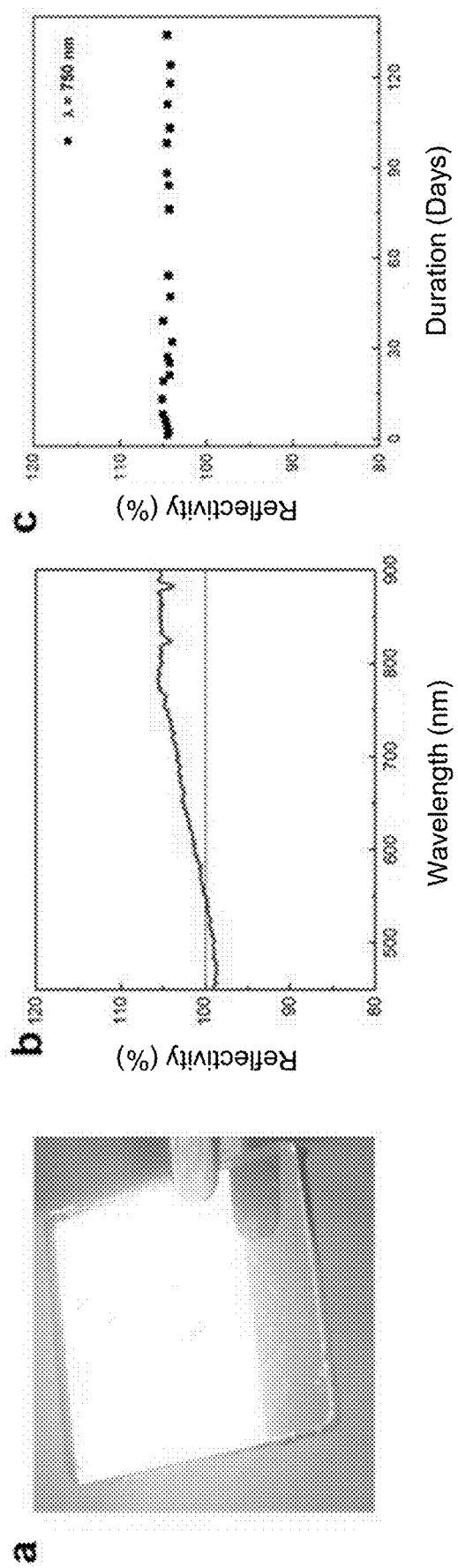
FIG. 2 is a physical diagram of a smooth and flat sodium interface prepared in Example 1 and performance diagrams of an optical structure device with the smooth sodium interface.

In a glove box filled with the inert gas argon, with the ambient oxygen concentration less than 20 ppm and the water concentration less than 20 ppm, the following steps were carried out:
1. a sodium block with a certain size was placed in a tungsten boat, oxides on the surface were cut off to enable the sodium block to have metallic luster, then the tungsten boat containing the sodium block was heated to 160° C. on a heating table to melt the sodium block into liquid, and oxides and impurities on the surface of the molten sodium were stripped off using stainless steel tweezers to form a liquid sodium pellet with metallic luster;

2. a smooth quartz substrate with a size of 1.5 cm×1.5 cm×0.2 mm was put into a glove box, and quickly spun on a spin coater; the quartz substrate with periodic structures was spin-coated with the pure liquid sodium metal by thermally-assisted spin coating at 160° C. and 6000 r/min; the liquid sodium was tightly attached to the quartz substrate to prepare a sodium interface, which is smooth and flat in a physical diagram as shown in a of FIG. 2; and 3. the other surface of the smooth sodium interface was covered with a glass slide, and meanwhile the peripheries, which were in contact with the quartz substrate and the glass slide, were sealed with epoxy resin to obtain an optical structure device (a sodium device for short) with the smooth sodium interface.

With a standard silver mirror (Thorlabs, PF10-03-P01) taken as a reference, the reflectivity of the sodium device was tested. As can be seen in b of FIG. 2, the sodium device has higher reflectivity than the silver mirror at wavelengths greater than 550 nm. The reflectivity of the prepared sodium device was tested after the sodium device was exposed to the air for more than 120 days. As shown in c of FIG. 2, the reflectivity of the sodium device is still retained, indicating that the sodium device prepared herein can be stably exposed to the air for long-term operation.

Example 2

A sodium interface was prepared according to the method of Example 1, and the difference between these two methods is that, in the method of Example 2, a sodium block was melted at 180° C. by heat in step (1), and a quartz substrate was spin-coated with the resulting liquid sodium at 180° C. and 8000 r/min in step (2). The prepared sodium interface was close to that of Example 1, and both had a smooth and flat surface.

Example 3

Figure 3:
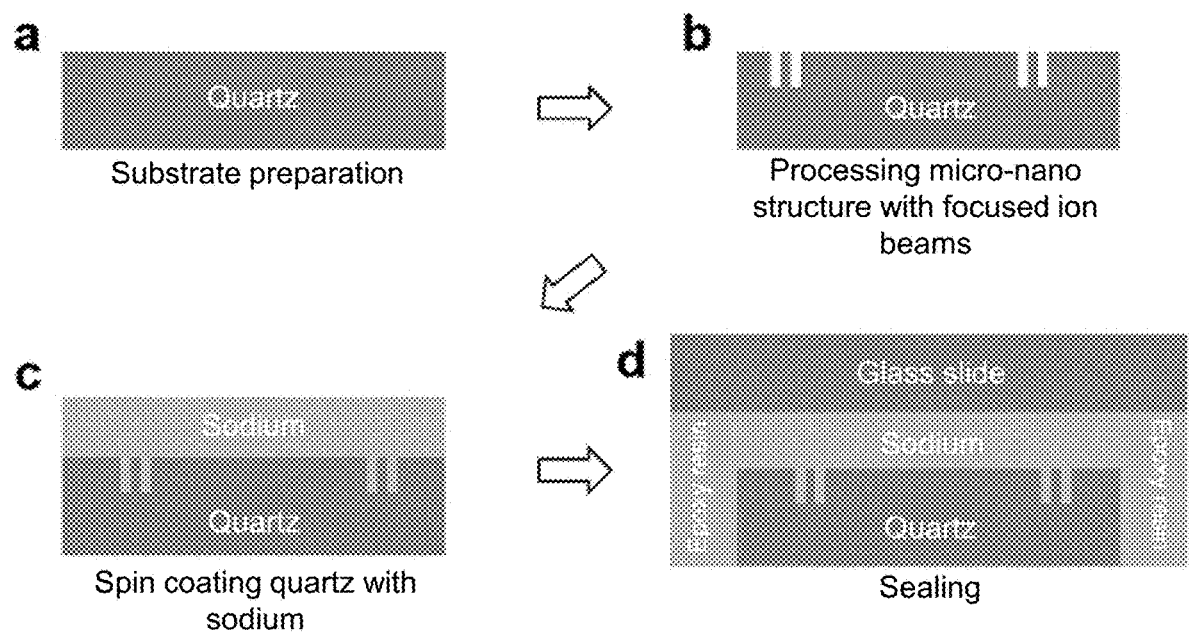
FIG. 3 is a flowchart of a process for preparing a sodium-based micro-nano optical structure device in Example 3.

A sodium-based micro-nano optical structure device was prepared as in FIG. 3 by the following specific steps.

(1) a micro-nano structure was processed on a dielectric substrate:

A. a silver film with a thickness of about 30 nm was subjected to physical vapor deposition on a quartz substrate with a size of 1.5 cm×1.5 cm×0.2 mm to form a conductive layer;

B. a periodic pore array with a pore size of 300 nm, a period of 700 nm and a depth of 55 nm was etched on the quartz substrate coated with silver using a focused ion beam, wherein the array had a length of 1.4 μm and a width of 0.7 μm, and a pore array with the same period size was processed at an interval of 100 μm, such that the distance between these two periodic arrays was 100 μm;

C. the silver on the surface of the quartz substrate was removed with nitric acid to obtain the quartz substrate only having the periodic pore arrays, as shown in b of FIG. 3. The quartz plate was ultrasonically cleaned for 30 min with acetone, ethanol and deionized water separately;

D. the cleaned quartz plate was annealed in a muffle furnace at 700° C. for 6 min; and E. the annealed sample was etched using argon plasma for 5 min to remove gallium remained in the periodic structures subjected to the focused ion-beam etching.

(2) In a glove box filled with the inert gas argon, with the ambient oxygen concentration less than 20 ppm and the water concentration less than 20 ppm, the following steps were carried out:

1. a sodium block with a certain size was placed in a tungsten boat, oxides on the surface were cut off to enable the sodium block to have metallic luster, then the tungsten boat containing the sodium block was heated to 160° C. on a heating table to melt the sodium block into liquid, and oxides and impurities on the surface of the molten sodium were stripped off using stainless steel tweezers to form a liquid sodium pellet with metallic luster;

2. the quartz substrate etched with the periodic structures was put into a glove box, and quickly spun on a spin coater; the quartz substrate with the periodic structures was coated with the pure liquid sodium metal by thermally-assisted spin coating at 160° C. and 6000 r/min; the liquid sodium was tightly attached to the quartz substrate to prepare a periodic sodium structure, as shown in c of FIG. 3; and 3. the other surface of the periodic sodium structure was covered with a glass slide, and meanwhile the peripheries, which were in contact with the quartz substrate and the glass slide, were sealed with epoxy resin to obtain a sodium-based micro-nano optical structure device, as shown in d of FIG. 3, which can be exposed to the air.

Figure 4:
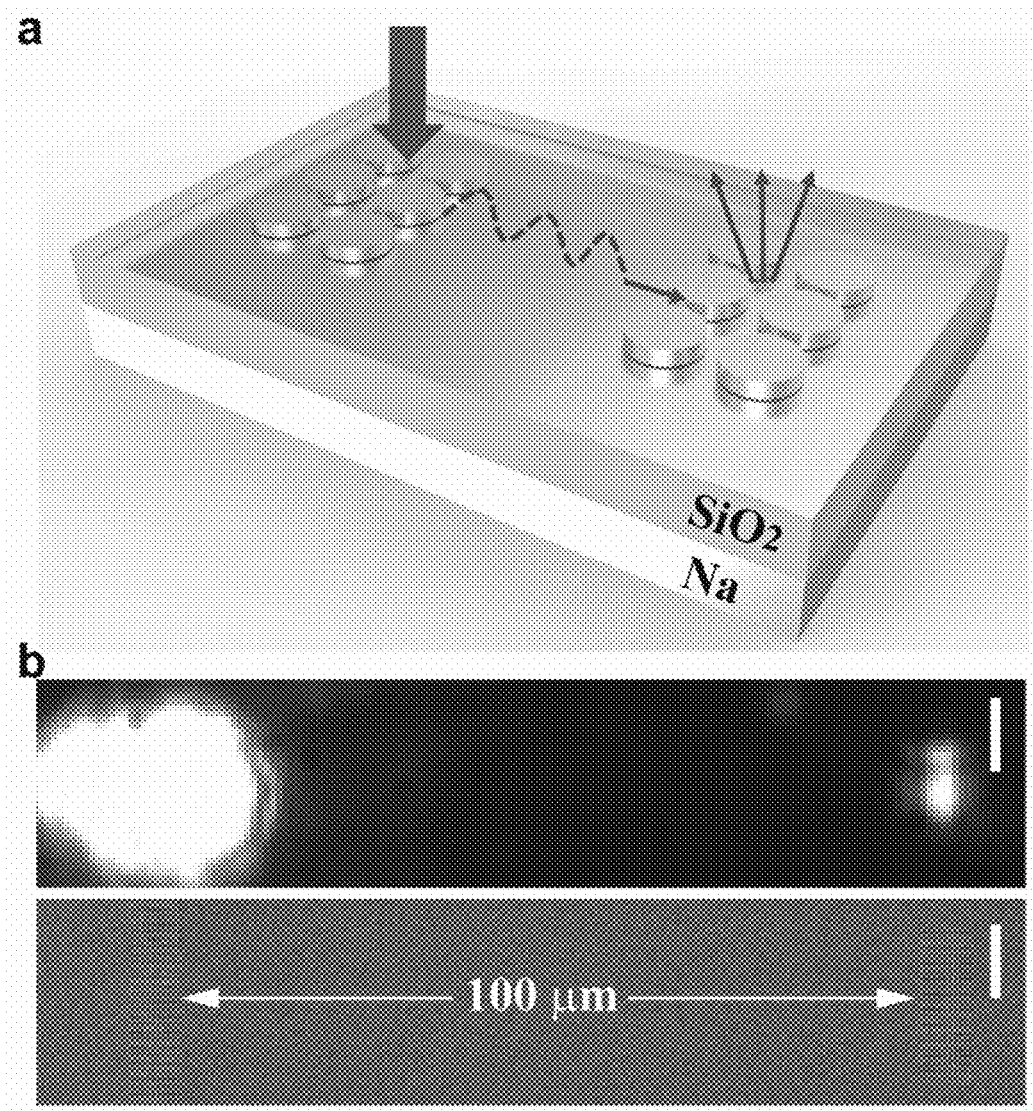
FIG. 4 is a diagram of a plasmon propagation effect of the sodium-based micro-nano optical structure device in Example 3.

Laser with a wavelength of 1180 nm was selected to penetrate through the quartz substrate into one of the periodic structures so as to enable the light to be coupled with the structure. As shown in FIG. 4, the light could be observed to be coupled out of the other periodic structure that was 100 μm away via a charge coupled device (CCD), thereby realizing surface plasmon polariton propagation.

Example 4

A sodium-based micro-nano optical structure device was prepared according to the method of Example 3, and the difference between these two methods is that, in the method of Example 4, the sodium block was melted at 150° C. by heat in step (1), and a quartz substrate was spin-coated with the liquid sodium at 150° C. and 4000 r/min in step (2).

Laser with a wavelength of 1180 nm was selected to penetrate through the quartz substrate into one of the periodic structures, and light could be observed to be coupled out of the other periodic structure that was 100 μm away via a charge coupled device (CCD), thereby realizing surface plasmon polariton propagation.

What is claimed is:

1. A method for preparing a sodium interface, wherein the method is carried out in an inert gas atmosphere with an oxygen concentration less than 20 ppm and a water concentration less than 20 ppm, and the method comprises the following steps:

step (1) melting solid sodium metal into liquid by heat to obtain molten sodium metal, and stripping off solid oxides and impurities on a surface of the molten sodium metal to obtain liquid sodium with metallic luster, wherein the liquid sodium does not include the solid oxides and the impurities; and step (2) spin-coating a dielectric substrate with the liquid sodium to obtain the sodium interface tightly attached to the dielectric substrate.

2. The method for preparing a sodium interface according to claim 1, wherein in the step (1), the liquid sodium has a temperature of 150-180° C.

3. The method for preparing a sodium interface according to claim 1, wherein the dielectric substrate is a transparent substrate capable of isolating the sodium interface from air and not reacting with sodium.

4. The method for preparing a sodium interface according to claim 1, wherein a surface, which is in contact with the liquid sodium, of the dielectric substrate is a flat surface or a surface provided with a micro-nano structure, and the corresponding prepared sodium interface is a smooth sodium interface or a sodium interface with a micro-nano structure.

5. The method for preparing a sodium interface according to claim 1, wherein the sodium interface is prepared in a glove box filled with an inert gas, with the ambient oxygen concentration less than 20 ppm and the water concentration less than 20 ppm.

6. A method for preparing a sodium-based optical structure device, wherein the method is carried out in an inert gas atmosphere with an oxygen concentration less than 20 ppm and a water concentration less than 20 ppm, and the method comprises the following steps:
step (1) melting solid sodium metal into liquid by heat to obtain molten sodium metal, and stripping off solid oxides and impurities on a surface of the molten sodium metal to obtain liquid sodium with metallic luster, wherein the liquid sodium does not include the solid oxides and the impurities;
step (2) spin-coating a first dielectric substrate with the liquid sodium to obtain a sodium interface tightly attached to the dielectric substrate; and
step (3) covering the surface, which is not in contact with the first dielectric substrate, of the sodium interface with a second dielectric substrate, and then sealing peripheries, which are in contact with the first dielectric substrate and the second dielectric substrate, of the sodium interface, so as to completely isolate the sodium interface from air, thereby obtaining the sodium-based optical structure device.

7. The method for preparing a sodium-based optical structure device according to claim 6, wherein in the step (1), the liquid sodium has a temperature of 150-180° C.

8. The method for preparing a sodium-based optical structure device according to claim 6, wherein a surface, which is in contact with the liquid sodium, of the first dielectric substrate is a flat surface or a surface provided with a micro-nano structure.

9. The method for preparing a sodium-based optical structure device according to claim 6, wherein the first dielectric substrate is a transparent substrate capable of isolating the sodium interface from air and not reacting with sodium, and the second dielectric substrate is a substrate capable of isolating the sodium interface from air and not reacting with sodium.

10. The method for preparing a sodium-based optical structure device according to claim 6, wherein the sodium-based optical structure device is prepared in a glove box filled with an inert gas, with the ambient oxygen concentration less than 20 ppm and the water concentration less than 20 ppm.

* * * * *